United States Patent [19]

Hathaway

[11] Patent Number: 4,497,679

[45] Date of Patent: Feb. 5, 1985

[54] METHOD OF FORMING PLASTIC ENVELOPES

[76] Inventor: Charles T. Hathaway, 518 S. Rancho Lindo, Covina, Calif. 91724

[21] Appl. No.: 311,038

[22] Filed: Oct. 13, 1981

[51] Int. Cl.³ ............................................. B32B 31/18
[52] U.S. Cl. .................... 156/251; 156/285; 156/515; 226/95; 226/195
[58] Field of Search .............. 156/250, 251, 285, 324, 156/515; 226/7, 8, 48, 95, 195

[56] References Cited

U.S. PATENT DOCUMENTS

| | | | |
|---|---|---|---|
| 2,735,797 | 2/1956 | Schjeldahl | 156/251 |
| 3,368,930 | 2/1968 | Beason | 156/251 |
| 4,112,799 | 9/1978 | Daenen | 226/95 |
| 4,345,709 | 8/1982 | Barton | 226/195 |

FOREIGN PATENT DOCUMENTS 703756  2/1954  United Kingdom ............... 156/515

Primary Examiner—Caleb Weston
Attorney, Agent, or Firm—Harlan P. Huebner

[57] ABSTRACT

The invention includes apparatus for and process of forming a plurality of plastic mounting envelopes from continuous plastic sheet material through cutting the plastic and bead sealing the margins by providing a high energy source to sever the plastic and bond the marginal edge of said plastic without physical contact.

The invention also includes said plastic envelopes to serve as mounts and protectors for receiving flat paper objects such as stamps, letters, etc.

4 Claims, 10 Drawing Figures

METHOD OF FORMING PLASTIC ENVELOPES

BACKGROUND OF THE INVENTION

In the preparation of plastic protective mounts that are used to display stamps and other flat objects it is desirable to utilize a plastic which is of high strength, stability and possesses superb clarity. Such a plastic is a polyester film. For use as stamp mounts it has been found that films of 0.0010 to 0.0050" are statisfactory. There are various manufactures of polyester film (polyethylene terephthalate) which is nominally a thermoplastic film, but it is generally not regarded as heat sealable in an untreated state.

Many attempts have been made to marginally bond or seal polyester films without success. One known way that such sealing can occur is to manufacture a polyester film with a coextruded sealant. Various combinations of coatings (polyolefin, polymer, saran) on polyester film, on one or both sides, may be used to create a wide range of films with specific properties. However, such coatings would have the effect of reducing the clarity of polyester and introducing potentially detrimental coating in direct contact with the stamp. This could be detrimental when viewing a stamp for possible appraisal, sale or even just for the pleasure of a philatelist and for any long term storage, etc.

There are various prior art devices which have been used to form plastic envelopes such as U.S. Pat. No. 2,735,797. However, the patent is apparently aimed at polyethylene film and uses a bar sealer, which would not work on polyester. Additionally, the structure of U.S. Pat. No. 3,368,930 would not accomplish the intended result of the present invention. There, polyolefins are the subject of sealing with an air jet to cool the sealed area. This would be too late in the case of polyester.

Should untreated polyester films be attempted to be marginally sealed there is a disorientation of the film beyond the sealing area thus creating random or at best irregular seals which are not acceptable.

SUMMARY OF THE INVENTION

It is a purpose of this invention to provide apparatus and a method of marginally heat sealing at least a pair of polyester films or sheets superimposed one on the other.

Another object of the invention is to provide mechanical support for the polyester films at the time of sealing the same.

A still further object resides in providing a mandrel over which the polyester films or sheets may ride with a high energy heat source to sever the films and seal one to the other along a marginal edge thereof.

Another object of the invention is to provide an additional high energy heat source to marginally seal the films or sheets normal to the first marginal seal of said films to form a completed plastic envelope.

A further object is to provide apparatus for the continuous marginal sealing of polyester films forming envelopes which may be subsequently cut for use or used as produced by said apparatus.

A further object of the invention is to produce polyester film envelopes which are formed from two or more contacting films or sheets which are marginally sealed wherein the polyester film is untreated with any form of sealant coatings.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which.

DETAILED DESCRIPTION OF THE PREFERRED EMBODIMENT

Figure 1:
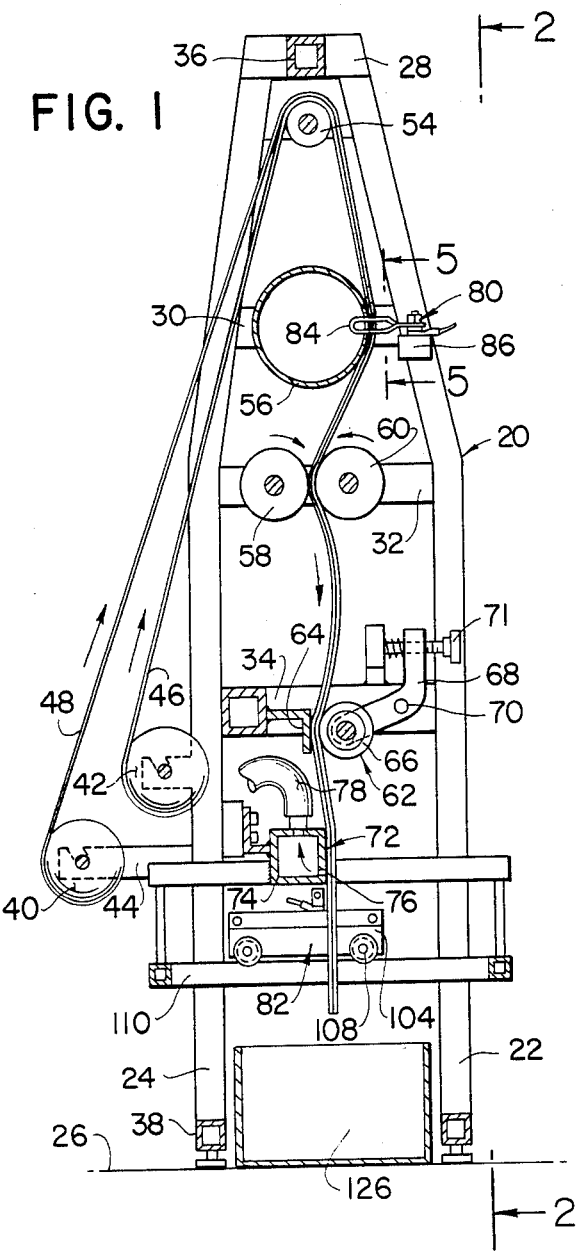
FIG. 1, is a side elevational view, partially in section of the apparatus to formed marginal sealed polyester envelopes.
Figure 2:
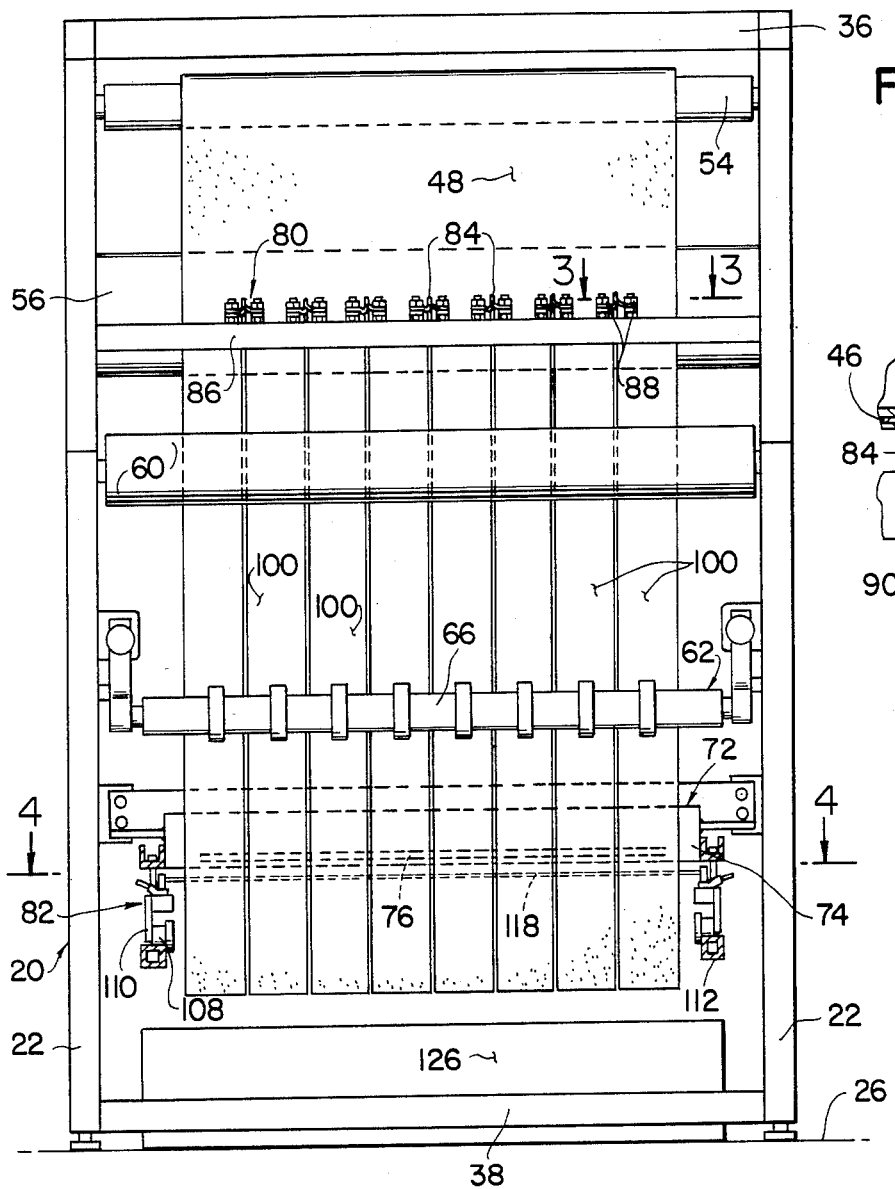
FIG. 2, is a view taken in line 2—2 of FIG. 1 showing the front of the apparatus.

Now referring specifically to FIGS. 1 and 2 there is illustrated plastic envelope forming apparatus generally designated 20. The apparatus preferably includes a pair of vertical end members each having legs 22 and 24 which project from a floor 26 upward terminating in a top strut 28. The legs 22 and 24 include spacer struts or cross supports 30, 32 and 34. In order to maintain the pair of legs spaced apart, as best seen in FIG. 2 there are horizontal supports 36 and 38. Thus there is created a frame for the apparatus 20.

At the rear of the apparatus 20, best seen in FIG. 1 are two rolls of plastic film or sheets 40 and 42 such as polyester, polyethylene terephthalate. Each roll 40 and 42 is preferably suspended on cradles 44 one above the other extending from the legs 24. The polyester film sheets 46 and 48 from rolls 40 and 42 are each preferably of a thickness of 0.0010 to 0.0050". In addition the back of film 46 may be coated with an opaque coating 52 which also contains a water-moistenable adhesive. However, when it is desirable to form an envelope which is clear and transparent on both sides the coating 52 may be eliminated.

The sheets 46 and 48 as seen in FIG. 1 are threaded upwardly over an idler roller 54 which extends between the vertical legs. The sheets at the point of the roller 54 are not only aligned one over the other but are superimposed one over the other in planar contact along the roller 54. From the roller 54 the sheets 46 and 48 are threaded downwardly over a fixed mandrel 56 mounted between cross-supports 30. The mandrel 56 preferably contains an arcuate front face for the juxtaposed sheets 46 and 48 to ride over. The preferred arc is a gradual one. Should the arc be too severe, a "set" of the film or sheets will take place then the heat sealing is applied and the finished product will be excessively curved and not serve its intended function.

The film 46 and 48 then proceed downward between a pair of drive rollers 58 and 60 which extend between cross supports 34 of the end legs. The drive rollers 58 and 60 may be powered by any conventioned drive means (not shown) such as an electric motor and drive train. Further, the drive means may be manually operated or programmed.

The drive rollers 58 and 60 are in contacting relationship so that when in operation they will draw the film sheets 46 and 48 up over roller 54 and downward over mandrel 56.

From rollers 58 and 60 the sheets 46 and 48 pass downward by gravity with no more apparatus to pull them downward. Below the rollers 58 and 60 there is positioned a mechanical stop clamp means, generally designed 62, extending between cross supports 34. The means 62 preferably include a fixed back stop 64 and a clamp roller 66 which is mounted at each end to a bell crank 68 whereby by any appropriate means (not shown) the crank can be shifted about pivot 70 so as to move the roller 66 into and out of engagement with the stop 64. A setting screw 71 may be utilized to adjust travel of clamp roller 66.

As the sheets 46 and 48 pass between the stop 64 and roller clamp 66 they may be gripped so as to prevent further gravitational fall. This will also create a bow in the sheets between the drive roller 58 and 60 and the stop clamp means 62.

Below the stop clamp means 62 is a vacuum holding means 72 which preferably includes a vacuum head 74 extending from one side to the other, see FIG. 2. The head includes an elongated slot 76 at the front thereof. Extending from the head is a vacuum hose 78 which passes to a conventional vacuum motor not shown.

When it is desired to hold the film sheets 46 and 48 in position, for purposes to be explained, the vacuum is activated and the sheets passing in front of the vacuum head 74 will be drawn to the head and held in contact therewith until released.

Next we turn to a first and second cutting and sealing apparatus generally designated 80 for making vertical cuts and seals and generally designated 82 for horizontal cuts and seals.

The first cutting and sealing means 80 is imposed in the path of downward travel of the superimposed sheets 46 and 48 adjacent to the mandrel 56 in the upper portion of the apparatus 20.

The means 80 preferably includes a plurality of hot wires 84 which are mounted on an insulation bar 86 which extends across the apparatus 20 between the upright front legs 22. Each wire 84 is a resistance wire that can be a loop with a pair of terminals 88 which are attached to electric wires 90 and 92 which extend to an electrical source not shown.

Figure 5:
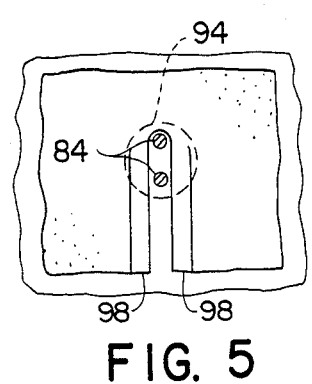
FIG. 5, is an enlarged detail view of the first sealing element and film taken on line 5—5 of FIG. 1.
Figure 3:
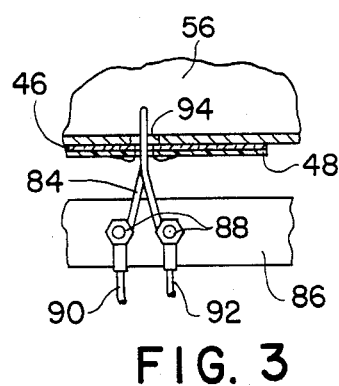
FIG. 3, is an enlarged detailed view of a first cutting and sealing element taken on line 3—3 of FIG. 2.

The loops of the hot wires 84 extend inwardly into openings 94, best seen in FIGS. 3 and 5 cut into the mandrel 56. The spacing of the hot wires 84 will depend on the width of the final mounting envelope 94, FIG. 6, to be produced.

In operation the superimposed sheets are threaded by hand to the drive rollers 58 and 60 and then the resistance wires 84 will be activated and moved into position so that the radiating heat will penetrate the sheets 46 and 48. As the rollers 58 and 60 continue to pull the sheets downward the resistance wires 84 which are interposed in the path of the sheets cut the sheets and form a bead seal 98, best seen in FIGS. 5 and 6, which create elongated ribbons 100 where the sheets are sealed along the side edges.

It has been found that for best results a low voltage electric current be used to pass to the resistance wires for best cutting and sealing effect. With the use of proper wire diameter and amperage the wire never actually touches the sheets as they are drawn past the heated wires 84. The pure radiant concentrated heat actually melts the polyester before contact. Should any molten polyester touch the wire the temperature of the wire is such as to vaporize the material and thus prevent any sticky or tacky liquified polyester from remaining on the wires and causing irregular cuts and seals.

An illustration of such combination of wires and energy found acceptable is the use of No. 20 Nichrome wire about 0.037" thick, and electrical current of about 12 amps or to use a No. 24 Nichrome wire about 0.020" thick, with electric current of about 7 amps.

It can be seen that the heat and vaporization will form the bead seal 98 which usually varies between 15 and 18 mils along the edge of the plastic ribbons 100.

Thus from the first cutting and sealing apparatus 80 the ribbons 100 proceed downward through the apparatus discussed above.

When the ribbons 100 travel to the vacuum means 62 and it is activated the second cutting and sealing means 82 will be heated to cut the ribbons 100 into the finished mounting envelopes 96.

The second cutting and sealing means 82 preferably includes a cart 102 with a frame. There are side supports 104 and 106 which include rollers or wheels 108 adapted to move forwardly and rearwardly on rails 110 and 112. Cross supports 114 and 116 unite the side supports 104 and 106 to complete cart 102. Any conventional drive means (not shown) such as a reversible motor may be linked with the cart to move the same back and forth.

Extending between the side supports 104 and 106 is a resistance or hot wire 118 of a gauge comparable with the wires 82. At each end the wires may be connected to electrical terminals 120 and 122 and hence by electrical wires to an energy source not shown. The wire 118 is as close to the vacuum head 74 as possible to ensure proper cutting and sealing.

Figure 4:
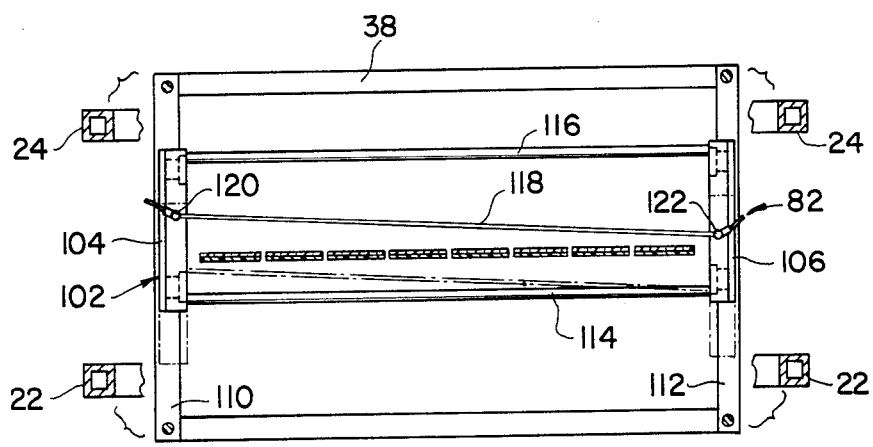
FIG. 4, is a sectional view taken on line 4—4 of FIG. 2 illustrating a second cutting and sealing element.

It is preferred that the wire 118 be angled relative to the horizontal back and forth movement as best seen in FIG. 4 for reasons to be explained.

When the drive rollers 58 and 60 have moved the ribbons 100 and gravity continues the downward movement beyond the vacuum head 74 to a predetermined distance, the stop clamp means 62 and the vacuum are activated and each ribbon 100 is pulled to the head 74 and held to prevent movement of the ribbon 100 during horizontal cutting and sealing.

At that point the second cutting and sealing means 82 is activated and the cart 102 will move forward. As the heated wire moves forward it will commence the cutting and form bottom and top bead seals 124 on the ribbons 100 on the right hand side of the apparatus 20 and continue the process across all of the ribbons 100 from right to left until the cart has reached its forward terminus, shown in phantom lines in FIG. 4.

The ribbons 100 below the resistance wire 118 are now the completed envelopes 96 and will fall into a container 126 or on a conveyor for packaging.

As the process continues the cart 102 will then be activated to return to its rear position and cut and seal the next section of ribbons 100 in the reverse way from left to right.

While there is shown a loop wire 84 for the first cutter and sealer it should be appreciated that a single resistance wire may be used with equal effect. Further, with the advent of new technology the use of laser beams may also be integrated without departing from the spirit of the invention.

Figure 6:
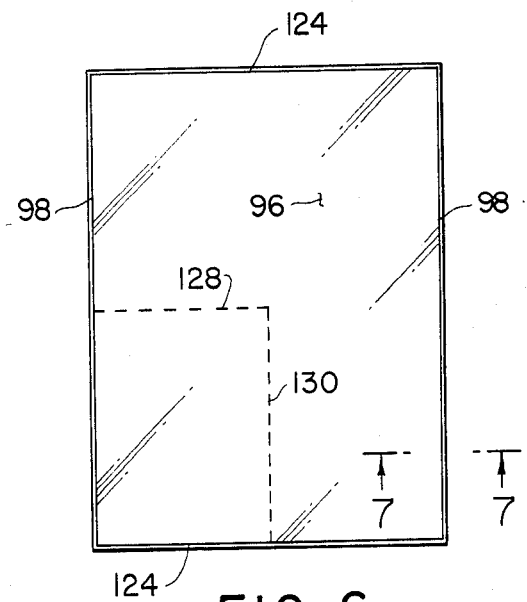
FIG. 6, is a front view of a completed plastic envelope where the two contacting films are marginally sealed.
Figure 7:
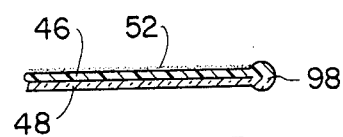
FIG. 7, is a cross sectional view of the envelope taken on line 7—7 of FIG. 6.
Figures 8, 9:
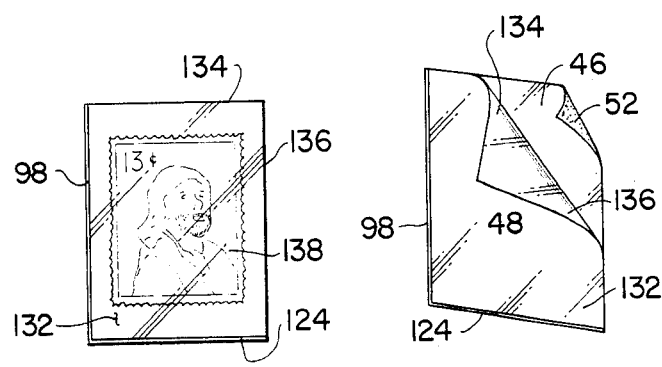
FIG. 8, is an environmental view of a plastic mount formed from the envelope of FIG. 6 with a stamp mounted therein.
FIG. 9, is a perspective view of a stamp mount with an adhesive backing on one side of a plastic film to mount the same.

With regard to the mounting envelope 96, FIG. 6 the dimensions may be varied depending on the setting of the cutting and sealing means. Generally, in the case of the envelopes 96 when they are to be used for stamp mounting, the envelopes 96 are large enough to be used for more than one stamp. Therefore, the envelope 96 may be cut with scissors along dotted lines 128 and 130 forming an individual mount 132, see FIGS. 8 and 9. By cutting along lines 128 and 130 open edges 134 and 136 are formed for access to the mount 132. The other marginal edges are sealed by bead seals 98 and 124.

The stamp 138 may then be placed between the sheets 46 and 48 through either of the edges 134 and 136, centered and if it is desired to permanently secure the mount in a stamp book, etc., the adhesive coating 52 may be wetted.

As can be seen from FIG. 6 with a cut from the lower left quadrant of the envelope 96 there are at least three remaining quadrants which can be cut and used as individual mounts 132.

Figure 10:
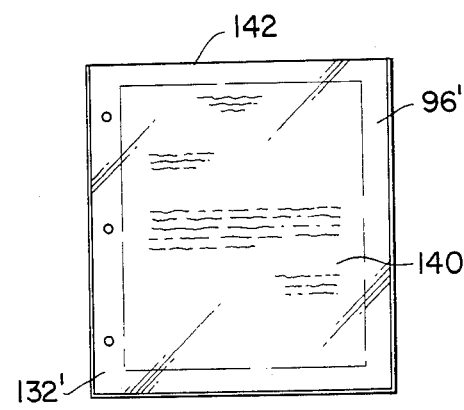
FIG. 10, is a modified mount wherein a larger flat paper may be mounted therein.

In the case of the modified envelope 96' FIG. 10, to form a large protective mount 132', the sheets of polyester may both be clear to read both sides of the protected letter or document. The process of forming these type of mounts 132' would normally require a repositioning of the cutting and sealing wires 84 with fewer so the ribbons 100 would be much wider.

To open the upper end 142 for an access, the envelope 98' may be cut. In addition, if there are no heated wire on the outer edges of sheets 46 and 48 they will remain open forming the upper end 142. Also by replacing appropriate heated wires 84 with cutting blades (not shown) or replacing the second cutting and sealing means 82 with cutting blades (not shown) openings on one, two or three sides can be accomplished.

The invention and its attendent advantages will be understood from the foregoing description and it will be apparent that various changes may be made in the form and method of making, construction and arrangements of the parts without departing from the spirit and scope thereof or sacrificing its material advantages, the arrangements herein before described being merely by way of example. I do not wish to be restricted to the specific forms shown, method, or uses mentioned, except as defined in the accompanying claims, wherein various portions have been separated for clarity of reading and not for emphasis.

I claim:

1. The process of forming plastic protective envelopes from sheet polyester which is untreated with material to aid in marginal bead sealing including:
    superimposing at least one sheet of relatively thin untreated polyester upon another sheet of relatively thin untreated polyester;
    drawing said superimposed sheets over a mandrel;
    interposing a plurality of fixed first cutting and sealing means independent of said mandrel in the path of said sheets capable of simultaneously cutting said sheets into endless strips and bead sealing endless marginal edges of said strips;
    feeding said sealed strips through stop clamp means to regulate the speed and metering of said strips;
    positioning a vacuum means in the path of said metered strips adapted to releasable retain said strips in a fixed position; and
    activating a second cutting sealing means adjacent said vacuum means in the path of said vacuum retained strips capable of simultaneously cutting said metered strips and bead sealing marginal edges normal to said endless marginal edges to form said individual untreated polyester envelopes.

2. The process as defined in claim 1 wherein there is included the step of:
    selecting resistance wires for said simultaneously fixed first and second cutting and sealing means and selecting an electrical current of appropriate amperage to melt and cut said untreated polyester without touching the same.

3. The process as defined in claim 2 wherein there is included the steps of:
    forming circumferential openings along said mandrel;
    projecting a single resistance wire into each of said openings whereby the wires intercept the path of travel of said superimposed untreated polyester sheets forming said sealed strips.

4. The process as defined in claim 3 wherein there is included the additional step of:
    mounting independently said second cutting and sealing means for movement normal to the direction of travel of said sealed strips;
    utilizing a single resistance wire of a length to cut and seal across all of said endless strips; and
    biasing said resistance wire to the line of travel of said second cutting and sealing means whereby said endless strips are sequentially cut and bead sealed as said wire moves normal to the direction of travel of said sealed strips.

* * * * *